United States Patent
De Smet et al.

(10) Patent No.: US 10,371,031 B2
(45) Date of Patent: Aug. 6, 2019

(54) METHODS AND SYSTEMS FOR INTRODUCING REDUCTANT INTO AN EXHAUST PASSAGE

(71) Applicant: Ford Global Technologies, LLC, Dearborn, MI (US)

(72) Inventors: Frederik De Smet, Genk (BE); Monika Angst, Aachen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 203 days.

(21) Appl. No.: 15/387,366

(22) Filed: Dec. 21, 2016

(65) Prior Publication Data

US 2017/0175607 A1   Jun. 22, 2017

(30) Foreign Application Priority Data

Dec. 22, 2015 (DE) .......................... 10 2015 226 550

(51) Int. Cl.

| | |
|---|---|
| *F01N 3/20* | (2006.01) |
| *F01N 13/00* | (2010.01) |
| *F01N 3/08* | (2006.01) |
| *F01N 3/10* | (2006.01) |
| *F01N 11/00* | (2006.01) |
| *F02M 26/06* | (2016.01) |
| *F02M 26/15* | (2016.01) |

(52) U.S. Cl.
CPC ........... *F01N 3/208* (2013.01); *F01N 3/0814* (2013.01); *F01N 3/0842* (2013.01); *F01N 3/103* (2013.01); *F01N 3/2066* (2013.01); *F01N 11/007* (2013.01); *F01N 13/0093* (2014.06); *F02M 26/06* (2016.02); *F02M 26/15* (2016.02); *F01N 2560/026* (2013.01); *F01N 2610/02* (2013.01); *F01N 2900/1616* (2013.01); *Y02A 50/2325* (2018.01); *Y02T 10/24* (2013.01)

(58) Field of Classification Search
CPC .... F01N 3/103; F01N 13/0093; F01N 3/0814; F01N 3/0842; F01N 11/007; F01N 2610/02; F01N 2900/1616
See application file for complete search history.

(56) References Cited

U.S. PATENT DOCUMENTS

| | | | | |
|---|---|---|---|---|
| 2014/0360163 | A1* | 12/2014 | Kurtz .................. | F02D 41/0052 60/274 |
| 2015/0240682 | A1* | 8/2015 | Gupta ...................... | F01N 9/00 60/274 |
| 2016/0115851 | A1* | 4/2016 | Kogo .................... | F01N 3/2066 60/276 |
| 2016/0131003 | A1* | 5/2016 | Kogo ...................... | F01N 11/00 60/276 |
| 2016/0131063 | A1* | 5/2016 | Kogo .................. | F02D 41/1462 60/276 |
| 2017/0122168 | A1* | 5/2017 | Angst .................... | F02M 26/06 |

FOREIGN PATENT DOCUMENTS

| | | | |
|---|---|---|---|
| DE | 102004048141 A1 | 4/2006 | |
| DE | 102006043101 A1 | 7/2007 | |

* cited by examiner

*Primary Examiner* — Patrick D Maines

(74) *Attorney, Agent, or Firm* — Julia Voutyras; McCoy Russell LLP

(57) ABSTRACT

Methods and systems are provided for an exhaust passage having a plurality of catalysts. In one example, a method may include injecting reductant via one or more injectors of the exhaust passage and monitoring injection conditions by flowing exhaust gas to the engine.

13 Claims, 8 Drawing Sheets

METHODS AND SYSTEMS FOR INTRODUCING REDUCTANT INTO AN EXHAUST PASSAGE

CROSS REFERENCE TO RELATED APPLICATION

The present application claims priority to German Patent Application No. 102015226550.1, filed on Dec. 22, 2015. The entire contents of the above-referenced application are hereby incorporated by reference in its entirety for all purposes.

FIELD

The present description relates generally to injecting reductant into an exhaust passage having two selective catalytic reduction devices with an EGR passage located therebetween.

BACKGROUND/SUMMARY

In internal combustion engines, catalytic aftertreatment of the exhaust gases has become widely established for the purposes of complying with legally prescribed emissions values. In order to increase efficiency, modern internal combustion engines often operate with lean fuel-air mixtures with an excess of oxygen. Nitrogen oxides that are generated cannot be reduced during lean-burn operation, because the catalytic reduction of said nitrogen oxides is possible only during rich operation. Therefore, during lean-burn operation, the nitrogen oxides in the exhaust gas are temporarily stored in a NOx trap catalyst, also referred to as lean NOx trap (LNT). If the capacity of the LNT is exhausted, a cycle with a rich exhaust-gas mixture, or substoichiometric operation ($\lambda<1$), is performed for the purposes of regenerating the LNT. Such a regeneration is also referred to as rich purge. The aim of said cycle is to reduce the temporarily stored nitrogen oxides.

For the reduction of the nitrogen oxides, use may also be made of a nitrogen oxide reduction catalyst (hereinafter also referred to as catalyst for selective catalytic reaction, or SCR catalyst). A reducing agent is added to the exhaust gas. In general, as reducing agent, an aqueous urea solution is introduced into the exhaust tract upstream of the nitrogen oxide reduction catalyst. A nitrogen oxide reduction catalyst can store a certain amount of ammonia. If the storage function is exhausted, ammonia can escape from the catalytic converter in the event of overdosing. This phenomenon is also referred to as ammonia slippage. Use is also often made of two nitrogen oxide reduction catalysts, of which the first is an active nitrogen oxide reduction catalyst, for which a reducing agent is introduced into the exhaust tract directly upstream, and the second is a passive nitrogen oxide reduction catalyst, for which no reducing agent is introduced into the exhaust tract directly upstream.

The use of two SCR catalysts has numerous advantages. Firstly, the two SCR catalysts often function at different temperatures, such that a larger temperature window can be utilized. Here, the first SCR catalyst operates at a higher temperature than the second, giving rise to an altogether larger temperature window for the reduction of nitrogen oxides. Furthermore, the storage capacity of the first SCR catalyst is limited, for example because it is often the case that a particle filter is combined with the SCR catalyst; a second SCR catalyst thus permits a more effective removal of nitrogen oxides from the exhaust gas. Thirdly, a lower temperature minimizes the aging of the second SCR catalyst, wherein the aging would be manifested in greater ammonia slippage. A certain slippage through the first SCR catalyst is however desired in order that the second SCR catalyst also receives ammonia that it requires in order to reduce nitrogen oxides.

If a low-pressure EGR system (LP EGR, hereinafter referred to for simplicity as EGR) branches off from the exhaust tract, there is however the problem that ammonia passes to the internal combustion engine, and is oxidized there to form nitrogen oxides. This would, in a counterproductive manner, increase the nitrogen oxide content in the exhaust gas. It is therefore the object to as far as possible prevent the loss of ammonia via the EGR, and in the process supply sufficient reducing agent to the second SCR catalyst.

In one example, the issues described above may be addressed by an arrangement in a motor vehicle having an internal combustion engine with an exhaust tract from which a low-pressure exhaust-gas recirculation system branches off and in which an exhaust-gas aftertreatment system is arranged, the exhaust-gas aftertreatment system comprising a diesel oxidation catalyst, a first selective catalytic reduction device downstream of the diesel oxidation catalyst and upstream of an intersection in the exhaust tract from which the low-pressure exhaust-gas recirculation branches off, a second catalytic reduction device located in the exhaust tract downstream of the intersection; at least one first reducing agent feed device which is arranged upstream of the first selective catalytic reduction device and downstream of the diesel oxidation catalyst; and at least one second reducing agent feed device which is arranged downstream of the branching point of the exhaust-gas recirculation system and upstream of the second catalytic reduction device. In this way, the fraction of ammonia in the recirculated exhaust gas is reduced in relation to conventional arrangements, and in this way, additional nitrogen oxide production as a result of the engine-internal combustion of recirculated ammonia is limited. Owing to the presence of a second reducing agent feed device, the ammonia storage by the nitrogen oxide reduction catalysts may be increasingly controlled. Depending on driving conditions and temperature conditions, the amounts of reducing agent introduced can be varied between the first and the second reducing agent feed device. Since it is thus possible in many cases to eliminate significant ammonia slippage from the second catalytic converter, the arrangement of a second reducing agent feed device makes it possible to continue to operate the second catalytic converter in an advantageous manner without the need for conducting ammonia onward, and to nevertheless permit the reduction of nitrogen oxides by way of the third catalytic converter.

In the description, the terms reducing agent and ammonia are used synonymously. In particular, reducing agent is spoken of when referring to the feed into the exhaust tract, because the reducing agent is generally an aqueous urea solution, in particular the commercially available AdBlue®, which is hydrolyzed in the exhaust tract or catalyst to form ammonia and carbon dioxide. The reducing agent itself is however ammonia, which may possibly also be introduced directly into the exhaust tract.

As one example, the exhaust-gas aftertreatment system comprises multiple catalytic converters. The catalytic converters have in each case at least one catalyst, though may in each case also have multiple catalytic converters or exhaust-gas aftertreatment devices such as particle filters, in particular diesel particle filters. A catalyst, in particular an SCR catalyst, may in this case also be in the form of a coating of a particle filter and applied to said particle filter.

The first reducing agent feed device and/or the second reducing agent feed device is preferably designed for introducing gaseous ammonia into the exhaust tract. The second reducing agent feed device is particularly preferably a fourth catalytic converter which has at least one NOx trap catalyst. In this, ammonia can be formed from nitrogen oxides during a regeneration (rich purge). Said ammonia is then received, stored, and used for the reduction of nitrogen oxides, by the nitrogen oxide reduction catalyst that is arranged downstream in the third catalytic converter.

This embodiment of the fourth catalytic converter may make it necessary for fuel to be introduced into the exhaust tract upstream of the fourth catalytic converter, wherein then, the hydrocarbons contained in the fuel are utilized for effecting the regeneration (rich purge) of the fourth catalytic converter or of the NOx trap catalyst contained therein, during which ammonia is formed which can advantageously be utilized as reducing agent. It is therefore preferable if, in the arrangement according to the present disclosure, a feed device for fuel is arranged upstream of the fourth catalytic converter. In a particularly preferred embodiment, the feed device for fuel is an external fuel injector or a so-called vaporizer.

It is furthermore preferable if, in the arrangement, at least one nitrogen oxide sensor is arranged downstream of the third catalytic converter for the purposes of advantageously detecting a nitrogen oxide concentration in the exhaust tract.

A third aspect of the present disclosure relates to a controller storing instructions in non-transitory memory that when executed enable the controller to implement a method for controlling exhaust-gas purification by way of an arrangement according to the present disclosure, having the steps operating the internal combustion engine such that exhaust gas is conducted through the exhaust tract, introducing a reducing agent into the exhaust tract upstream of the second catalytic converter by way of the first reducing agent feed device, conducting nitrogen oxides not reduced in the second catalytic converter in the exhaust-gas flow onward to the third catalytic converter if said nitrogen oxides are not recirculated with the exhaust gas back to the internal combustion engine via the exhaust-gas recirculation arrangement, and introducing a reducing agent downstream of the branching point of the low-pressure exhaust-gas recirculation system and upstream of the third catalytic converter by way of the second reducing agent feed device.

In an exemplary embodiment, in the method, the fourth catalytic converter corresponds to the second reducing agent feed device, and the reducing agent that is introduced is gaseous ammonia produced by the fourth catalytic converter. However, the inventors herein have recognized potential issues with such systems.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
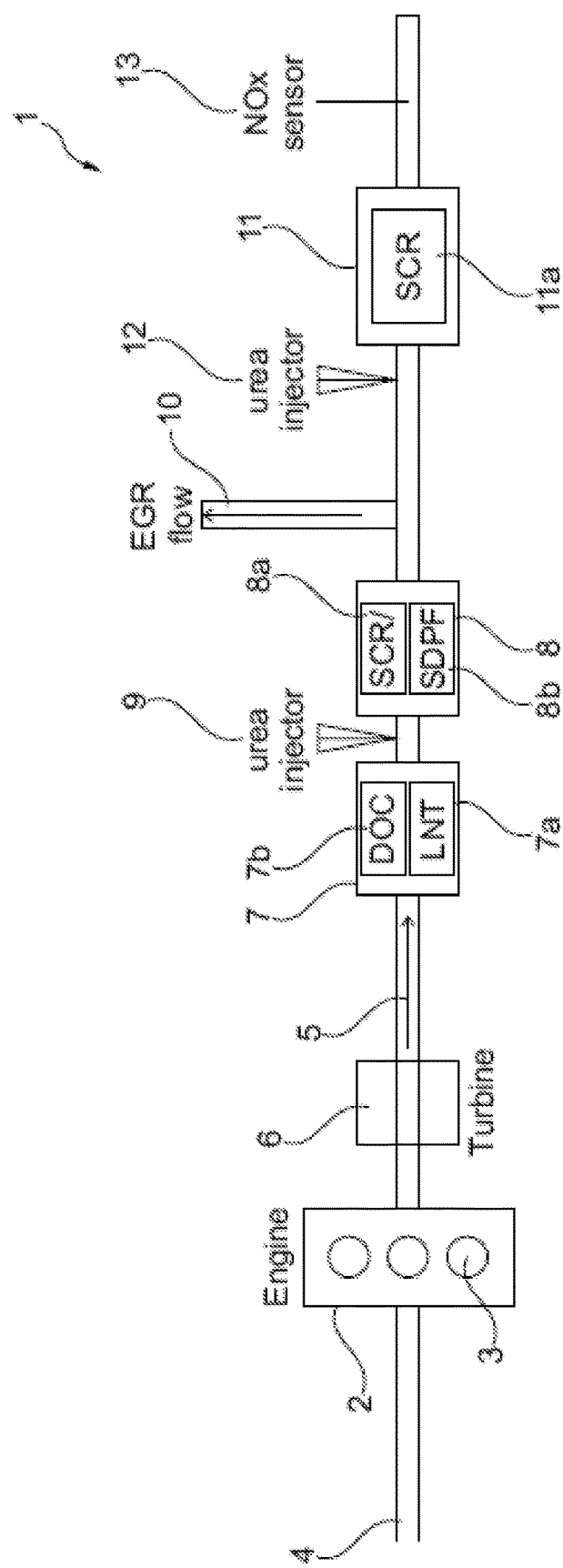
FIG. 1 shows a first embodiment of an engine having an exhaust system having one or more catalysts.
Figure 2:
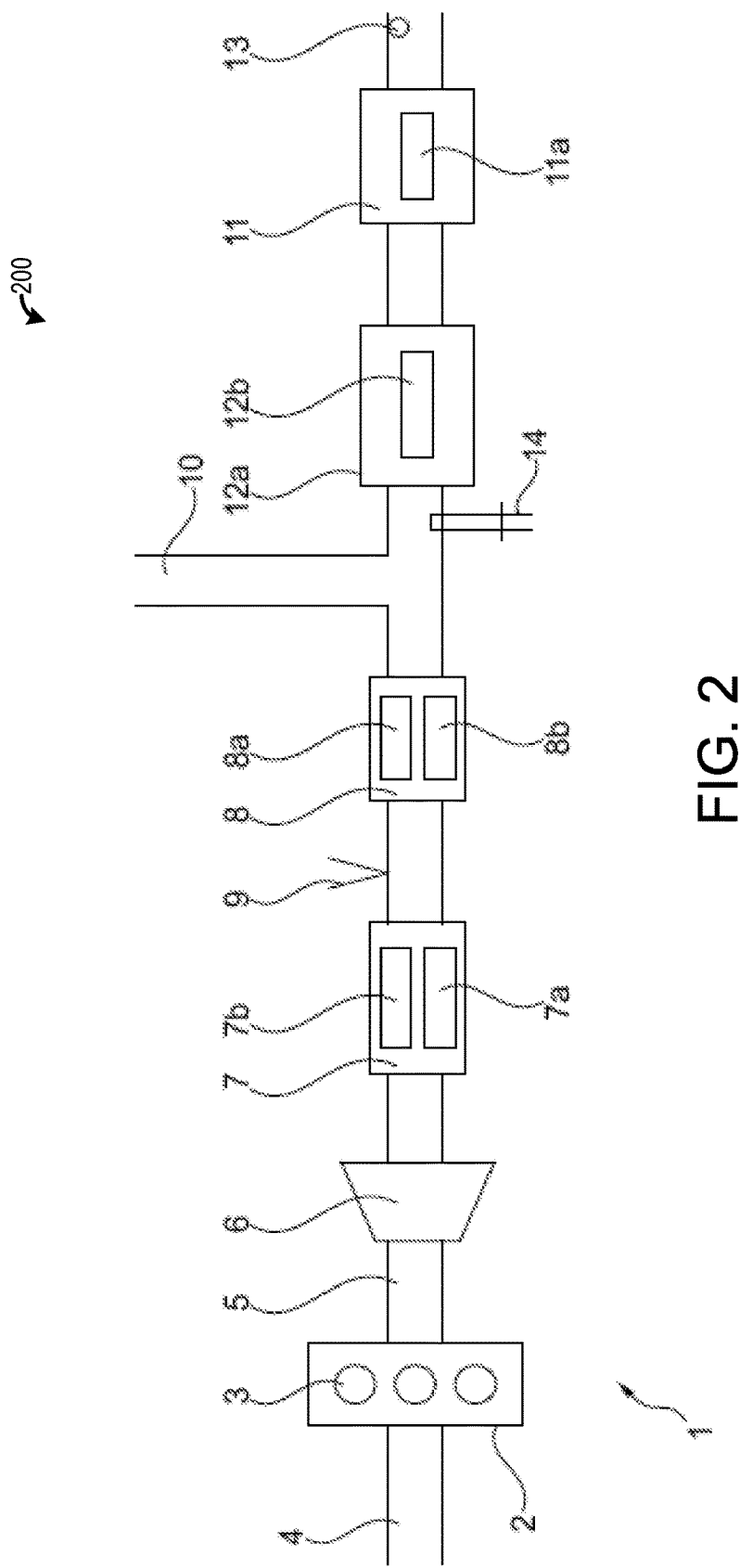
FIG. 2 shows a second embodiment of the engine.
Figure 4:
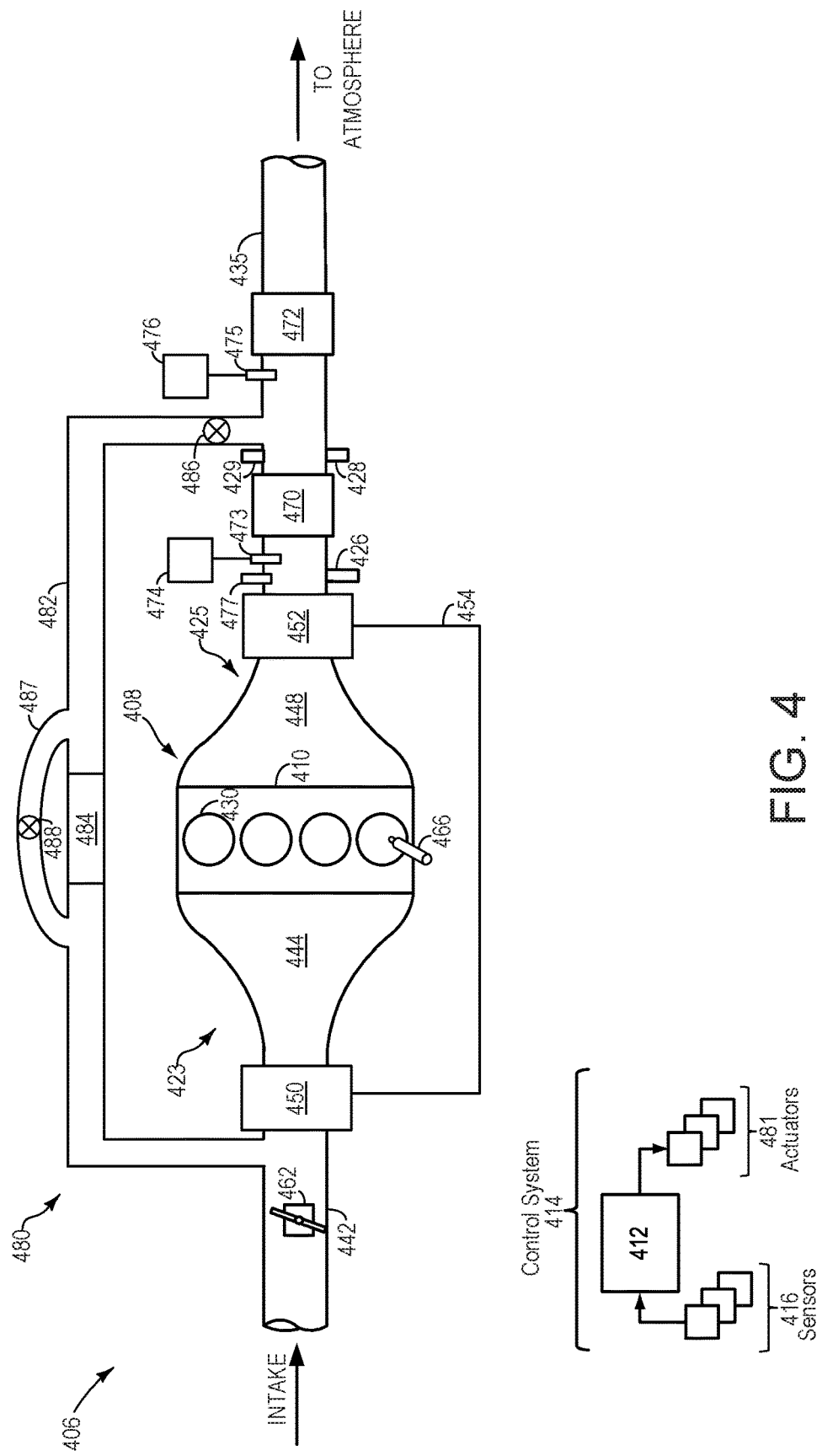
FIG. 4 shows an engine with a plurality of cylinders.

The following description relates to systems and methods for an exhaust system having a first catalyst and a second catalyst sharing similar functionalities. In one example, the first and second catalysts are both selective catalytic reduction (SCR) devices. Each of the first and second catalysts comprises a corresponding injector configured to inject reductant directly upstream of the catalyst. System depicting the exhaust system including the catalysts and the injectors are shown in FIGS. 1, 2, and 4. The systems depicted further include an exhaust gas recirculation (EGR) passage located between the catalysts. In one example, the EGR passage is a low-pressure (LP) EGR passage.

The first injector and second injector may be activated in conjunction or during separate times dependent on a reductant store of the first and second catalysts. Operation of the injectors is described in the method of FIG. 3. Determination of injection demands along with a coordination of injection amounts based on reductant stores of the catalysts is described in FIGS. 5A-5D.

Turning now to FIG. 1, it shows an arrangement 1 according to the present disclosure having an internal combustion engine 2. The internal combustion engine 2 may be an auto-ignition or applied-ignition internal combustion engine. The internal combustion engine 2 has three cylinders 3, though may also have a different number, for example two, four, five, six or eight cylinders in an inline, box, circular, and V-arrangement. The internal combustion engine 2 is connected to an intake tract 4 and to an exhaust tract 5.

A turbine 6 of a turbocharger is arranged in the exhaust tract 5. Alternatively, it is however also possible for no turbocharger, and thus also no turbine, to be provided.

Downstream of the turbine 6 there is arranged an exhaust-gas aftertreatment system which comprises multiple catalytic converters. A first catalytic converter 7 is situated directly downstream of the turbine 6. The first catalytic converter 7 may optionally include a nitrogen oxide trap catalyst 7a and/or an oxidation catalyst 7b.

Downstream of the first catalytic converter 7 there is arranged a second catalytic converter 8 which has a first catalyst for selective catalytic reduction (SCR catalyst) 8a. Furthermore, an SCR catalyst 8a may be arranged in the second catalytic converter 8, which can be a flow through catalyst or coated on a particulate filter (e.g., as shown by SDPF 8b). If the internal combustion engine 2 is an auto-ignition internal combustion engine, the particle filter 8b is a diesel particle filter.

A first reducing agent feed device 9 is arranged between the first 7 and the second catalytic converter 8 downstream of the turbine 6 in the exhaust tract 5, by means of which reducing agent feed device it is possible for reducing agent, for example an aqueous urea solution, in particular AdBlue®, to be introduced from a reducing agent tank (not shown) into the exhaust tract 5. The aqueous urea solution is thermolyzed in the exhaust tract 5 to form gaseous ammonia and isocyanic acid, and the isocyanic acid is in turn hydrolyzed to form ammonia and carbon dioxide.

Alternatively, it is also possible for gaseous ammonia to be introduced directly into the exhaust tract 5 (see below). The ammonia is stored in the first SCR catalyst 8*a* for use as reducing agent in the reduction of nitrogen oxides.

A branching point of a low-pressure EGR system (LP EGR) 10 is arranged downstream of the second catalytic converter 8. The LP EGR connects the exhaust tract 5 to the intake tract 4. In the LP EGR 10 there is arranged an exhaust-gas recirculation valve, which may be a combination valve (with fresh air and EGR input and a single output mixture) or an exhaust throttle valve, by way of which an exhaust-gas mass flow from the exhaust tract 5 into the intake tract 4 can be controlled.

A third catalytic converter 11 is arranged in the exhaust tract 5 downstream of the branching point of the LP EGR 10. The third catalytic converter 11 has a second SCR catalyst 11*a*. A second reducing agent feed device 12 is arranged between the branching point of the LP EGR 10 and the third catalytic converter 11, by means of which reducing agent feed device it is possible for reducing agent, for example an aqueous urea solution, in particular AdBlue®, to be introduced from a reducing agent tank (not shown) into the exhaust tract 5. The second reducing agent feed device 12 and first reducing agent feed device 9 may share a reducing agent tank. Alternatively, the devices may have separate reducing agent tanks.

As described above, as an alternative to the aqueous urea solution, it is also possible for gaseous ammonia to be introduced into the exhaust tract 5. Gaseous ammonia is provided for example either by virtue of said ammonia being provided in gaseous form in corresponding tanks or by virtue of said ammonia being provided so as to be stored in the crystalline structure of a salt, for example strontium chloride, wherein ammonia is desorbed from the salt in the event of heating.

Thus, an exhaust system comprises an exhaust passage, a first catalyst downstream of a turbine, a second catalyst downstream of the first catalyst, a third catalyst downstream of the second catalyst with a low-pressure exhaust gas recirculation (LP-EGR) passage branching off the exhaust passage from a location between the second and third catalysts, and a first injector located between the first and second catalysts and a second injector located between the LP-EGR passage and the second catalyst. The first catalyst is a diesel oxidation catalyst. Alternatively, the first catalyst is a nitrogen oxide trap. The second and third catalysts are selective catalytic reduction devices. The first and second injectors are configured to inject reductant into the exhaust passage.

Turning now to FIG. 2, it shows an alternate embodiment 200 of the arrangement 1. A fourth catalytic converter 12*a* is utilized as second reducing agent feed device. The fourth catalytic converter 12*a* has at least one second NOx trap catalyst 12*b*. In this, ammonia can be formed from nitrogen oxides during a regeneration (rich purge). Said ammonia is then received, stored, and used for the reduction of nitrogen oxides, by the nitrogen oxide reduction catalyst 11*a* that is arranged downstream in the third catalytic converter 11. In some embodiments, where the first NOx trap catalyst 7*a* is omitted, the second NOx trap catalyst 12*b* is the only NOx trap catalyst in the exhaust tract 5.

A feed device 14 for fuel is arranged upstream of the fourth catalytic converter 12*a*. The feed device 14 is designed for introducing fuel into the exhaust tract 5 upstream of the fourth catalytic converter 12*a*. The hydrocarbons contained in the fuel are utilized for effecting the regeneration (rich purge) of the fourth catalytic converter or of the NOx trap catalyst contained therein, during which ammonia is formed which can be advantageously utilized as reducing agent. The feed device 14 is for example a fuel injector or vaporizer.

A nitrogen oxide sensor 13 is arranged in the exhaust tailpipe of the exhaust tract 5 downstream of the third catalytic converter 11 for the purposes of measuring the nitrogen oxide concentration in the exhaust tract 5 and thus permitting an evaluation of the efficiency of the nitrogen oxide reduction. Further nitrogen oxide sensors and other types of sensors may be arranged in the exhaust tract 5 at various locations.

The nitrogen oxide sensor 13, the reducing agent feed devices 9, 12 (or 12*a*) and the fuel feed device 14 and the exhaust-gas recirculation valve (not shown) are connected to a regulating device (not shown) for regulating the operation of the arrangement 1. The regulating device can, for example on the basis of the nitrogen oxide concentration and the temperatures in the exhaust tract 5, determine the amounts of reducing agent that should be introduced into the exhaust tract 5.

Figure 3:
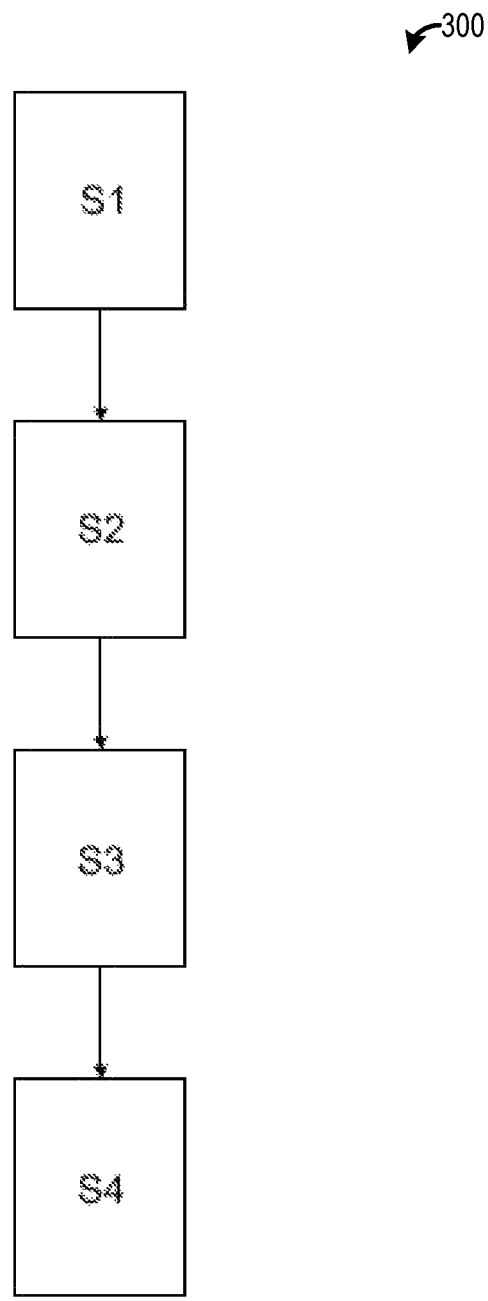
FIG. 3 shows a method configured to be implemented with the first and/or second embodiments.

Turning now to FIG. 3, it shows a method 300 for controlling exhaust-gas purification by way of the arrangement 1 as per FIG. 1, in a first step S1, the internal combustion engine 2 is operated such that exhaust gas is conducted through the exhaust tract 5. Here, during normal operation with a lean fuel-air mixture, nitrogen oxides are stored, and partially reduced, in the first nitrogen oxide trap catalyst 7*a* of the first catalytic converter 7. In a second step S2, an aqueous urea solution, alternatively for example also gaseous ammonia, is introduced into the exhaust tract 5 upstream of the second catalytic converter 8 by way of the first reducing agent feed device 9. In a third step S3, nitrogen oxides not reduced in the first SCR catalyst 8*a* pass, in the exhaust-gas flow, to the second SCR catalyst 11*a* if said nitrogen oxides are not recirculated with the exhaust gas back to the internal combustion engine 2 through the LP EGR 10. In a fourth step S4, a reducing agent is introduced into the exhaust tract 5 downstream of the branching point of the LP EGR 10 and upstream of the third catalytic converter 11 by way of the second reducing agent feed device 12. The reducing agent introduced by way of the second reducing agent feed device 12 may be identical to the reducing agent that was introduced into the exhaust tract 5 by way of the first reducing agent feed device 9. As an alternative, it is however also possible for different reducing agents to be conducted into the exhaust tract 5 by way of the reducing agent feed devices 9 and 12. For example, an aqueous urea solution may be conducted into the exhaust tract 5 by way of the first reducing agent feed device 9, and gaseous ammonia may be introduced by way of the second reducing agent feed device 12. Then, the remaining nitrogen oxides are as far as possible completely removed from the exhaust gas in the second SCR catalyst 11*a*.

In an alternative embodiment of the method according to the present disclosure for controlling exhaust-gas purification by way of the arrangement 1 as per FIG. 2, a reduction of nitrogen oxides in the exhaust-gas aftertreatment system is possible both during rich operation and during lean-burn operation of the internal combustion engine 2. In step S1, the internal combustion engine 2 is operated such that exhaust gas is conducted through the exhaust tract 5. Here, during normal operation with a lean fuel-air mixture, nitrogen oxides are stored in the first nitrogen oxide trap catalyst 7*a* of the first catalytic converter 7. In the second step S2, an aqueous urea solution, alternatively for example also gaseous ammonia, is introduced into the exhaust tract 5 upstream of the second catalytic converter 8 by way of the first reducing agent feed device 9. In the step S3, the nitrogen oxides not reduced in the first SCR catalyst 8a are conducted onward, in the exhaust-gas flow, to the second SCR catalyst 11a if said nitrogen oxides are not recirculated with the exhaust gas back to the internal combustion engine 2 through the LP EGR 10. In the step S4, gaseous ammonia is formed in the fourth catalytic converter 12a, which gaseous ammonia is fed to the second SCR catalyst 11a in the third catalytic converter 11.

Here, in step S4, fuel is conducted into the exhaust tract by way of the fuel feed device 14, the hydrocarbons of which fuel, during the regeneration (rich purge) of the fourth catalytic converter 12a or of the second NOx trap catalyst 12b contained therein, are oxidized in the fourth catalytic converter in an exothermic reaction, with the ammonia being formed.

FIG. 4 shows a schematic depiction of a vehicle system 406. The vehicle system 406 includes an engine system 408. The engine system 408 may include an engine 410 having a plurality of cylinders 430. Engine 410 includes an engine intake 423 and an engine exhaust 425. Engine intake 423 includes a throttle 462 fluidly coupled to the engine intake manifold 444 via an intake passage 442. The engine exhaust 425 includes an exhaust manifold 448 eventually leading to an exhaust passage 435 that routes exhaust gas to the atmosphere. Throttle 462 sits upstream of a compressor 450 and upstream of an EGR passage 482. In one example, the throttle 462 may function as a combination valve, acting as an intake throttle and EGR valve, as described above. In some examples, throttle 462 may be located in intake passage 442 upstream of a boosting device, such as the compressor 450, and downstream of the EGR passage 482. When included, an after-cooler may be configured to reduce the temperature of intake air compressed by the compressor 450 and/or boosting device 450. A turbine 452 is arranged in engine exhaust 425 and coupled to the compressor 450 via a shaft 454. As such, the turbine 452 comprises blades configured to spin as exhaust flows through the exhaust passage 435, thereby driving the compressor 450 to compress air.

Engine exhaust 425 may include one or more emission control devices 470 and 472, which may be mounted in a close-coupled position in the exhaust. One or more emission control devices may include a three-way catalyst, lean NOx filter, SCR device, diesel oxidation catalyst (DOC), etc. Herein, the emission control device 470 is a first catalyst 470. An emission control device 472 is located downstream of the first catalyst 470. The emission control device 472 is a second catalyst 472. In one example, both the first 470 and second 472 catalysts are SCR devices. Alternatively, the first catalyst 470 may be substantially identical to the second catalytic converter 8 of FIG. 1. Furthermore, the second catalyst 472 may be substantially identical to the third catalytic converter 11 of FIG. 1.

A first injector 473 is located downstream of the turbine 452 directly upstream of the first catalyst 470. The first injector 473 is coupled to a first reservoir 474, which is configured to store a reductant. In one example, the reductant is urea. As such, the first injector 473 is positioned to inject reductant in the exhaust passage 435 upstream of the first catalyst 470. A second injector 475 is located directly upstream of the second catalyst 472. The second injector 475 is coupled to a second reservoir 476, which is configured to store a reductant. In one example, the reductant is urea. Alternatively, the reductant is fuel. Thus, additionally or alternatively, the second reservoir 476 is a fuel tank, in one example. As such, the second injector 475 is positioned to inject reductant in the exhaust passage 435 upstream of the second catalyst 472 and downstream of the first catalyst 470. Although the first 473 and second 475 injectors are shown coupled to different reservoirs, it will be appreciated that the injectors may be coupled to a single reservoir without departing from the scope of the present disclosure. The injectors 473 and 475 may be activated based on a reductant demand of the first 470 and second 472 catalysts. The reductant demand may be determined in response to measuring a $NO_x$ concentration upstream of the first catalyst 470. Reductant demand is proportional to the upstream $NO_x$ concentration such that as the upstream $NO_x$ concentration increases, the reductant demand also increases. Said another way, as the amount of $NO_x$ measured upstream of the first catalyst 470 increases, an amount of reductant demanded similarly increases. Additionally or alternatively, the amount of reductant demanded may be adjusted by a correction factor including one or more of a threshold upstream $NO_x$, temperature, load, etc. For example, if the measured upstream $NO_x$ is less than the threshold upstream $NO_x$, then the injection amount demanded may be decreased such that it is no longer proportional to the measured upstream $NO_x$. Additionally or alternatively, if the temperature is less than a threshold injection temperature, then the injection amount may be decreased such that it is no longer proportional to the measured upstream $NO_x$. This may be due to poor injection dispersion at temperatures lower than the threshold injection temperature.

In some embodiments, additionally or alternatively, reductant demand may be based on a reductant storage target of the first 470 and/or second 472 catalyst. Reductant storage values may be tracked based on model information or information stored in a multi-input look-up table comprising inputs corresponding to engine load, injection amount, engine $NO_x$ output, and other factors related to reductant consumption in the catalysts. As such, the injection amount may be adjusted (e.g., increased or decreased) with regard to the reductant storage target.

Feedback of sufficient reductant injection may be monitored via measuring a $NO_x$ concentration downstream of the first catalyst 470 being higher than a threshold downstream $NO_x$ concentration, where the downstream $NO_x$ concentration is based on an amount of $NO_x$ expected to flow through a catalyst with a desired amount of reductant. In this way, the catalyst is not sufficiently reducing $NO_x$ and reductant stores are low if the downstream $NO_x$ concentration is less than the threshold downstream $NO_x$ concentration and the injection may continue. In one example, a $NO_x$ trap is located between the second injector 475 and the second catalyst 472. Thus, the second reservoir 476 is configured to store fuel and the second injector 475 injects fuel into the exhaust passage 435. The fuel may promote $NO_x$ reduction in the $NO_x$ trap, causing $NH_3$ to flow to the second catalyst. In some examples, the $NO_x$ trap may be relocated to a position between the turbine 452 and the first injector 473. Additionally or alternatively, a $NO_x$ trap is located in a position between the turbine 452 and the first injector 473.

EGR system 480 is configured to redirect exhaust gas from the exhaust passage 435 to the intake passage 442 when an EGR valve 486 is outside of a closed position (e.g., in a more open position). An EGR passage 482 is coupled to the exhaust passage between the first catalyst 470 and the second injector 475. At an opposite end, the EGR passage 482 is coupled to the intake passage 442 upstream of the compressor 450. As such, the EGR passage 482 is a LP-EGR passage 482. As shown, the LP-EGR passage 482 comprises an EGR cooler 484 further comprising a cooler bypass 487 having a bypass valve 488. In one example, EGR flow through the LP-EGR passage 482 is used to monitor injection conditions to the first 470 and second 472 catalyst.

The vehicle system 406 may further include control system 414. Control system 414 is shown receiving information from a plurality of sensors 416 (various examples of which are described herein) and sending control signals to a plurality of actuators 481 (various examples of which are described herein). As one example, sensors 416 may include exhaust flow rate sensor 426 configured to measure a flow rate of exhaust gas through the exhaust passage 435, exhaust gas sensor (located in exhaust manifold 448), temperature sensor 428, and pressure sensor 429 (located downstream of emission control device 470). As another example, exhaust flow rates may be estimated based on feedback from an intake mass air flow sensor, EGR rate estimation, fueling conditions (e.g., pressure and amount of injection), intake manifold conditions (e.g., pressure), and volumetric efficiency. In one example, the exhaust gas sensor 426 may be located outside of the exhaust manifold, downstream of the turbine 452, and upstream of the first injector 473 in the exhaust passage 435. Other sensors such as additional pressure, temperature, air/fuel ratio, exhaust flow rate and composition sensors may be coupled to various locations in the vehicle system 406. As another example, the actuators may include fuel injectors 466, throttle 462, DPF valves that control filter regeneration (not shown), switch of electric circuit, etc. The control system 414 may include a controller 412. The controller 412 may be configured with computer readable instructions stored on non-transitory memory. The controller 412 receives signals from the various sensors of FIG. 4, processes the signals, and employs the various actuators of FIG. 4 to adjust engine operation based on the received signals and instructions stored on a memory of the controller. The control system 414 may further comprise an exhaust gas sensor 477 configured to sense nitrogen oxides upstream of the first injector 473.

The controller 412 receives signals from the various sensors of FIG. 4 and employs the various actuators of FIG. 4 to adjust engine operation based on the received signals and instructions stored on a memory of the controller. For example, adjusting injection amounts and/or pressures may include adjusting an actuator of the first 473 and/or second 475 injectors.

In one example, the controller 412 stores instructions in non-transitory memory that when executed enable the controller to implement a method comprising flowing low-pressure exhaust gas to an engine while a first injector is injecting, the first injector is positioned to inject into an exhaust passage upstream of a first catalyst and a low-pressure exhaust gas recirculation passage branches from the exhaust passage downstream of the first catalyst, sensing reductant slip through the first catalyst via an exhaust gas sensor located in an exhaust manifold upstream of the first injector, and adjusting injection conditions in response to a comparison between a sensed $NO_x$ value and a threshold $NO_x$ value.

The threshold $NO_x$ value is based on a sum of an expected engine output $NO_x$ and an expected $NO_x$ increase corresponding to the reductant slip. Thus, the reductant slip increases an overall $NO_x$ output of the engine. The adjusting includes decreasing an injection amount of the first injector in response to the comparison indicating the sensed $NO_x$ being greater than the threshold $NO_x$ value, and increasing the injection amount of the first injector in response to the comparison indicating the sensed $NO_x$ being less than the threshold $NO_x$ value. The adjusting further includes adjusting injection conditions of a second injector corresponding to a second catalyst, where the second injector is upstream of the second catalyst and downstream of the exhaust gas recirculation passage. Adjusting in response to the comparison includes increasing an injection amount of the second injector when the sensed $NO_x$ is greater than the threshold $NO_x$ value. Flowing low-pressure exhaust gas is in response to an engine exhaust gas recirculation demand or the first injector injecting. The controller may further comprise instructions for a method comprising injecting reductant into an exhaust passage via first and second injectors, where the first injector is upstream of an exhaust gas recirculation passage which is upstream of the second injector and flowing exhaust gas through the exhaust gas recirculation passage outside of an engine EGR demand in response to the first injector injecting reductant. The first injector and second injector inject urea.

Alternatively, the first injector injects urea and the second injector injects fuel, further comprising a third catalyst being located between the second injector and the second catalyst, wherein the third catalyst is a lean $NO_x$ trap.

The method further comprises adjusting injection amounts of the first and second injectors, the adjusting being in response to a comparison between a $NO_x$ sensed by an exhaust gas sensor in an exhaust manifold and a threshold value, the adjusting further comprising decreasing a first injector injection amount and increasing a second injector injection amount in response to the $NO_x$ sensed being greater than the threshold value. The first injector is configured to inject reductant into the exhaust passage directly upstream of a first catalyst located between the injector and the exhaust gas recirculation passage, and where the second injector is configured to inject reductant into the exhaust passage upstream of a second catalyst, and where the second injector is located between the exhaust gas recirculation passage and the second catalyst. The first injector and second injector inject in response to one or more of a reductant store of the first catalyst being less than a first threshold store and a reductant store of the second catalyst being less than a second threshold store. Injecting in response to the reductant store of the second catalyst being less than the second threshold store and a reductant volume in a second reservoir corresponding to the second injector is less than an injection amount determined for the second injector further includes dividing the injection amount between the first and second injectors based on a reductant slip through the first catalyst.

Turning now to FIGS. 5A, 5B, 5C, and 5D, they show a method 500 for operating the first and second injectors in response to estimating a reductant store of the first and second catalysts. In one example, the method 500 implements the systems depicted in FIG. 1, FIG. 2, and/or FIG. 4. Thus, reductant described below refers to urea for the first injector. However, reductant for the second injector may refer to urea or fuel (according to the embodiments of FIG. 1 or 2, respectively). Instructions for carrying out method 500 may be executed by a controller based on instructions stored on a memory of the controller and in conjunction with signals received from sensors of the engine system, such as the sensors described above with reference to FIG. 4. The controller may employ engine actuators of the engine system to adjust engine operation, according to the methods described below.

Figure 5A:
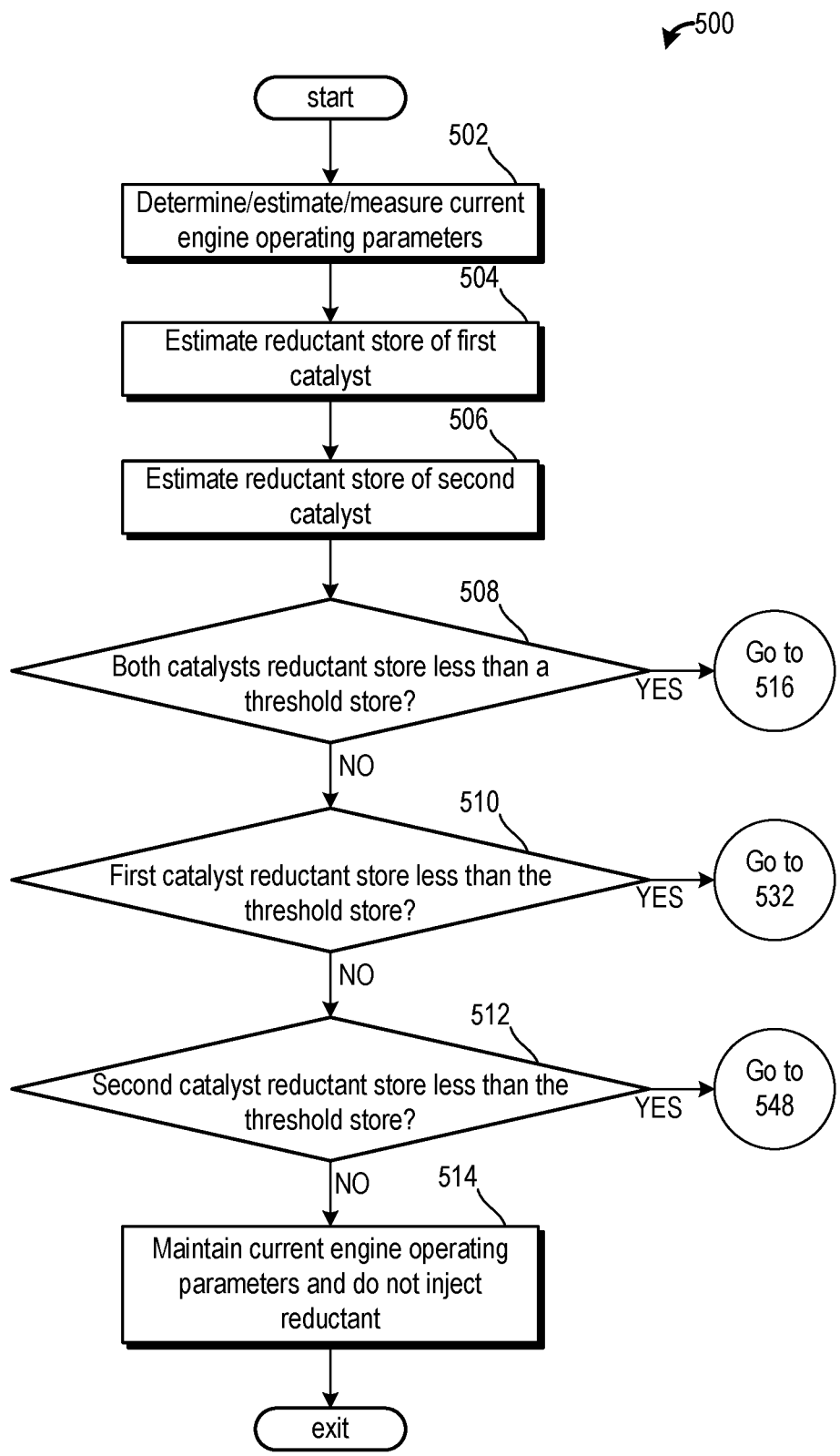
FIGS. 5A, 5B, 5C, and 5D show a method for operating injections to one or more of a first catalyst or a second catalyst.
Figure 5B:
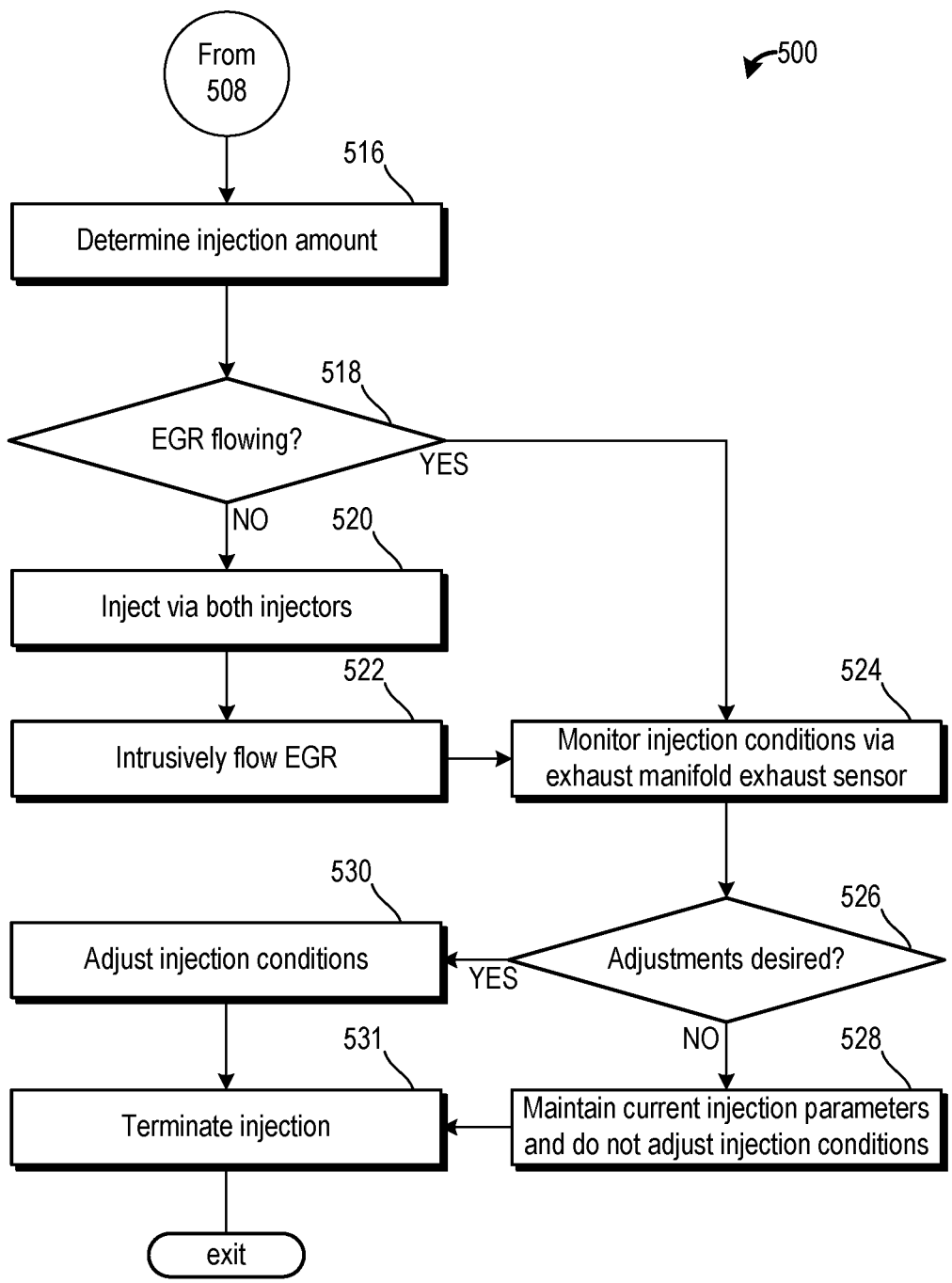

Turning now to FIG. 5A, the method 500 begins at 502, where the method 500 determines, estimates, and/or measures current engine operating parameters. Current engine operating parameters includes but is not limited to one or more of engine load, engine speed, manifold vacuum, exhaust temperature, engine temperature, throttle position, vehicle speed, and air/fuel ratio.

At 504, the method 500 includes estimating a reductant store of the first catalyst. The reductant store may be estimated based on a $NO_x$ concentration sensed downstream of the first catalyst. In one example, a $NO_x$ sensor is located between the first catalyst 470 and a branching of the LPEGR passage 482 of FIG. 4. If the sensed $NO_x$ is greater than a threshold $NO_x$, then reductant stores on the first catalyst are less than a threshold store and the first catalyst is unable to sufficiently reduce $NO_x$ emissions to less than the threshold $NO_x$.

Additionally or alternatively, the $NO_x$ sensor may be located in the exhaust passage upstream of the first catalyst and downstream of a turbine (e.g. upstream of first catalyst 470 and upstream of the turbine 452). The first catalyst reductant stores are determined to be less than a threshold store when $NO_x$ sensed at the $NO_x$ sensor is substantially equal to engine output $NO_x$. The engine output $NO_x$ may be based on values stored in a look-up table having multiple inputs, where the inputs are based on engine operating parameters described above. At least some of a reductant slip from the first catalyst is directed to the engine and participates in combustion. As such, the reductant (e.g., $NH_3$) is converted into $NO_x$, thereby producing an artificially high $NO_x$ value sensed at the $NO_x$ sensor in the exhaust manifold. In this way, if the $NO_x$ sensed at the sensor is substantially equal to expected engine output $NO_x$, then reductant is not slipping from the first catalyst and its reductant stores may be less than a first threshold store.

In one example, the reductant store is tracked based on engine operating parameters. This may include the engine operating parameters described above and further include first catalyst temperatures, injection amount, injection frequency, engine output $NO_x$, and other conditions altering reductant consumption. As an example, increased engine output $NO_x$ and/or increased exhaust gas and catalyst temperatures correspond to an increased rate of reductant consumption. Thus, the first catalyst reductant store may reach a low reductant.

At 506, the method 500 includes measuring a reductant store of the second catalyst. In one example, the reductant store of the second catalyst may be determined similarly to the reductant store of first catalyst. As such, a $NO_x$ sensor downstream of the second catalyst may compare a sensed $NO_x$ to a threshold $NO_x$ value. If the sensed $NO_x$ is greater than the threshold $NO_x$ value, then the reductant store of the second catalyst may be less than a second threshold store. Additionally or alternatively, the second catalyst reductant store is tracked based on engine operating parameters similar to the tracking of the first catalyst, but further includes tracking second injector amounts and frequencies and second catalyst temperatures. In some examples, the second threshold store is substantially equal to the first threshold store. Alternatively, the thresholds may be unequal. For example, a larger of the two catalyst may correspond to a larger threshold store.

At 508, the method 500 includes determining if the first and second catalyst reductant stores are less than the first and second threshold stores, respectively. If the first and second catalyst reductant stores are less than the first and second threshold stores, respectively, then the method 500 proceeds to 516 of FIG. 5B. If both of the first and second catalyst reductant stores are not less than the first and second threshold stores, then the method 500 proceeds to 510 to determine if the first catalyst reductant store is less than the first threshold store.

Figure 5C:
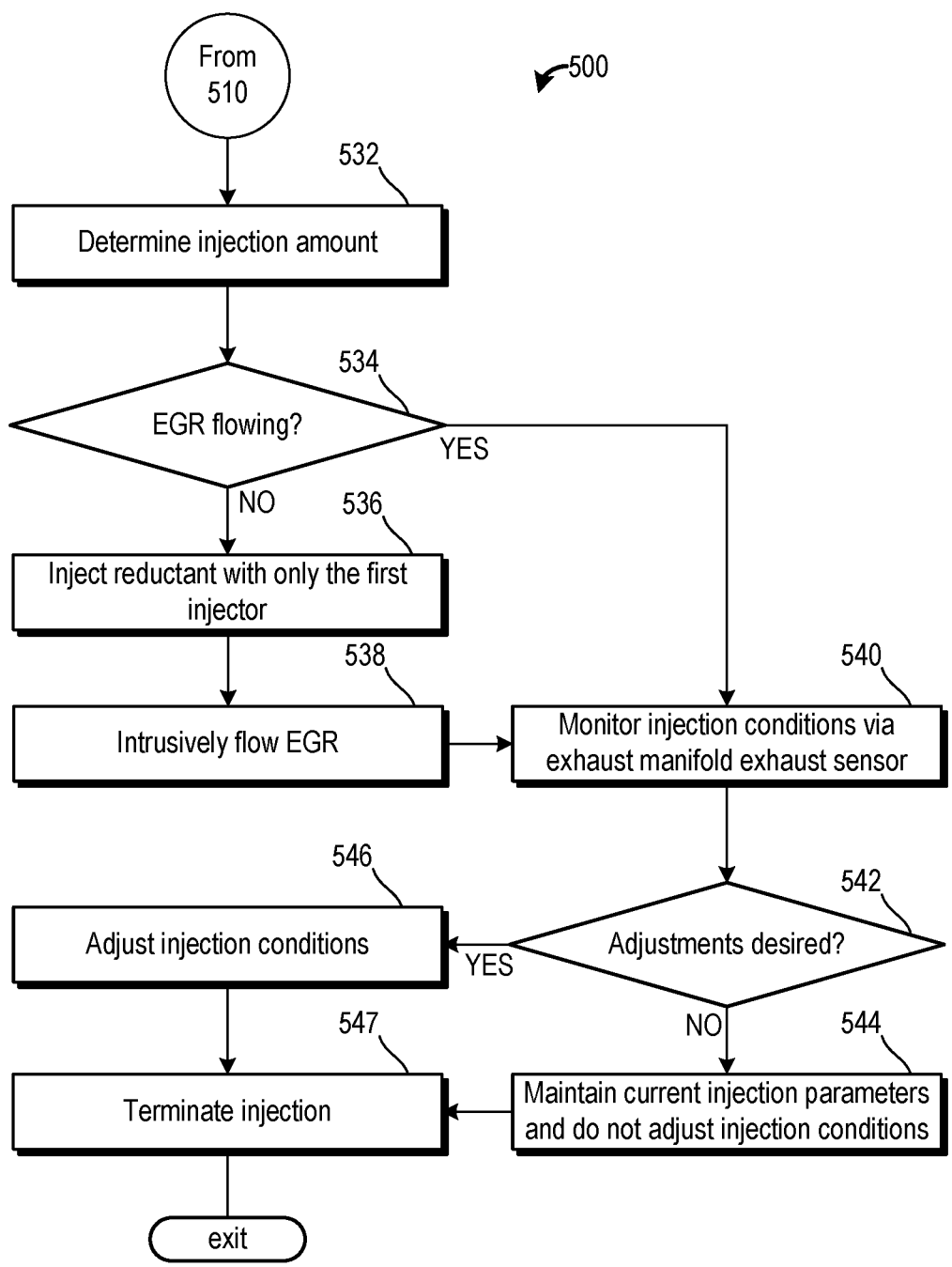

If the first catalyst reductant store is less than the first threshold store, then the method 500 proceeds to 532 of FIG. 5C. If the first catalyst reductant store is greater than the first threshold store, then the method 500 proceeds to 512 to determine if the second catalyst reductant store is less than the second threshold store.

Figure 5D:
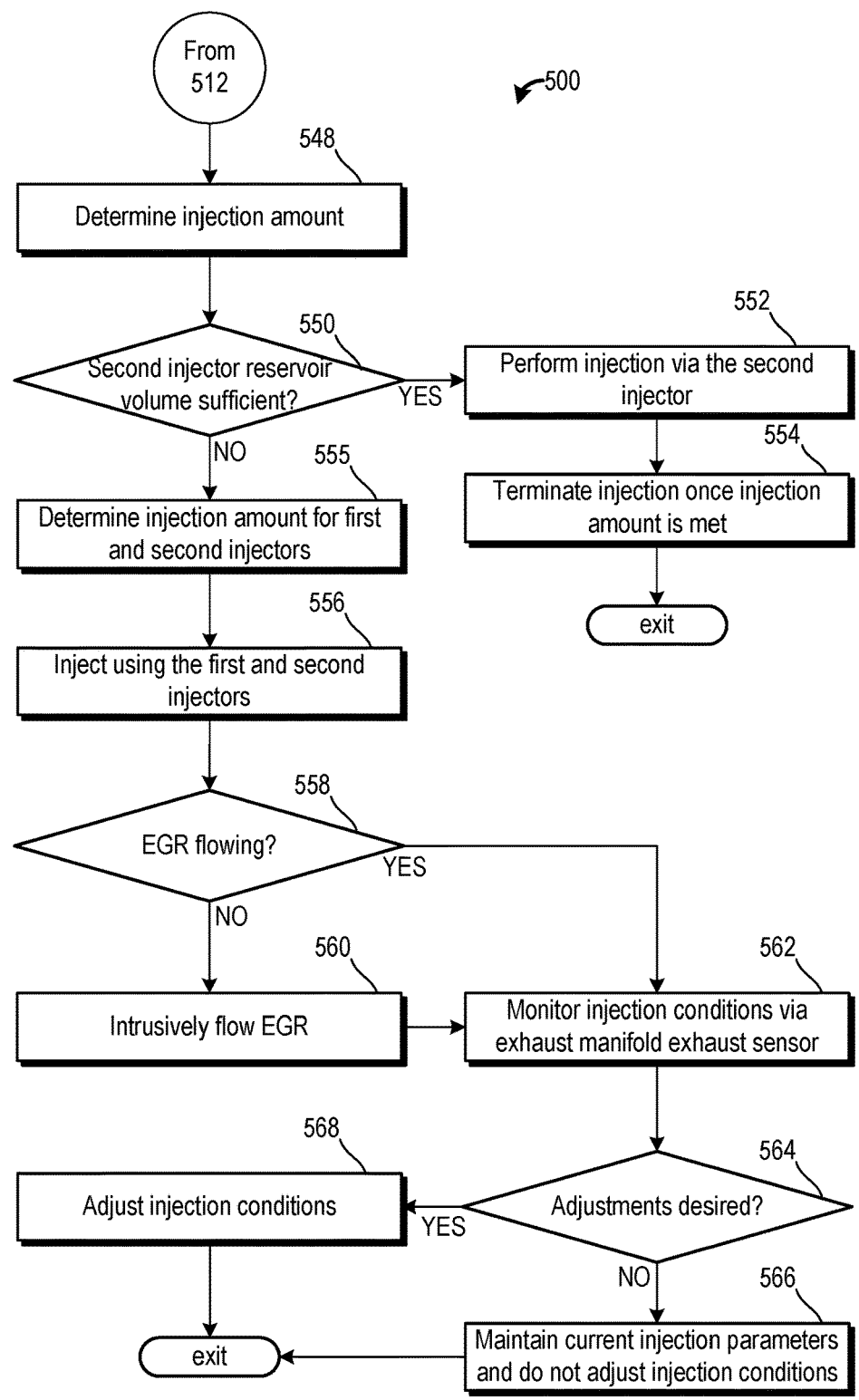

If the second catalyst reductant store is less than the second threshold store, then the method 500 proceeds to 548 of FIG. 5D. If the second catalyst reductant store is greater than the second threshold store, then the method 500 proceeds to 514 to maintain current engine operating parameters and does not inject via either a first injector (e.g., reductant feed device 9 of FIG. 1 or injector 473 of FIG. 4) or a second injector (e.g., reductant feed device 12 of FIG. 1 or injector 475 of FIG. 4). This is due to reductant stores of the first and second catalysts being sufficiently high to and NO output from both the catalysts is less than a threshold $NO_x$.

At 516, where the method 500 proceeds to following the determination that both the first and second catalyst reductant stores are less than the first and second threshold stores at 508, respectively, the method 500 includes determining an injection amount. A first injector injection amount may be proportional to a difference between the first catalyst store and the first threshold store. Likewise, a second injector threshold amount may be proportional to a difference between the second catalyst store and the second threshold store. In one example, additionally or alternatively, the injection amount is fixed and each iteration of the injection is substantially similar in amount. This may include injecting reductant at similar pressures over a similar duration. Additionally or alternatively, the injections are independent of one another and injection amounts are determined ignoring factors corresponding to the other catalyst. For example, the injection amount for the first injector is determined independent of conditions related to the second injector.

In one example, the injection amount includes an injection pressure and an injection duration. For example, as the injection amount increases, then one or more of the injection pressure and injection duration increases. In this way, the first and second injectors may have similar injection amounts, but different injection pressures and/or injection durations. In one example, the first injector has a lower injection pressure and longer injection duration than the second injector.

At 518, the method 500 includes determining if EGR is flowing through the LP-EGR passage (e.g., LP EGR passage 482 of FIG. 4). In one example, EGR flow is determined based on a position of an EGR valve (e.g., the EGR valve 486 of FIG. 4). For example, if the EGR valve is outside of a closed position (e.g., in a more open position), then EGR is flowing to the engine. Thus, EGR is not flowing when the EGR valve is in the closed position. If EGR is not flowing, then the method 500 proceeds to 520 to inject via both injectors. The injectors inject reductant amounts similar to those determined at 516. The injectors continue injecting until the respective injection amounts are met.

At 522, the method 500 includes intrusively flowing EGR. This includes flowing EGR outside of an engine EGR demand. As such, an amount of EGR is directed to the engine such that engine combustion conditions are not significantly altered. Furthermore, amount of intrusive EGR is sufficient for the $NO_x$ sensor in the exhaust gas manifold to monitor injection conditions. For example, as the first injector injects reductant, a portion of the injection may slip through the first catalyst, which may be captured by the LP-EGR passage and directed to the engine. The $NO_x$ sensor may measure the slipped reductant in the form of $NO_x$ and/or $NH_3$.

In one example, a nitrogen oxide sensor is located between the turbine and the first injector in the exhaust passage. The nitrogen oxide sensor transfers measured nitrogen oxide values to a closed loop control device of the controller which calculates an ammonia slip and a quantity of exhaust gas which has escaped from second exhaust gas after-treatment device 10 from the values on the basis of the following equation:

$$CNH3=(CNOx\_A-CNOx\_0*(1-rEGR)/(1-rEGR*(1-SCR1CnvEff)))/(rEGR*facCmbNH3toNOx).$$

CNH3 is the quantity of escaped ammonia, CNOX_A is the quantity of measured nitrogen oxides, sensed via the $NO_x$ sensor between the turbine and the first SCR device (e.g., catalyst 470), on the condition that a reducing agent has been introduced into the exhaust tract, CNOX_0 is the quantity of measured nitrogen oxides, sensed via the NOx sensor on the condition that no reducing agent has been introduced in the exhaust tract, rEGR is the rate of exhaust gas recirculation, facCmbNH3toNOx is a ratio of $NO_x$ from $NH_3$ combustion per $NH_3$ molecule entering the engine (e.g., quantifies the amount of $NH_3$ that is converted to $NO_x$ during combustion), and SCR1CnvEff is the efficiency of a SCR device with respect to its ability to reduce $NO_x$ into $N_2$ and water. If CNH3 is equal to zero, it is concluded from this that no ammonia has escaped from second exhaust gas after-treatment device 10 as a result of slip. If CNH3 is greater than zero, it is concluded from this that ammonia has escaped from second exhaust gas after-treatment device 10.

The method 500 proceeds to 524 following determination of EGR flowing at 518 or the initiation of intrusive EGR at 522, where the method includes monitoring injection conditions at the exhaust gas sensor in the exhaust manifold. The exhaust gas sensor includes at least a $NO_x$ sensing portion. In one example, the exhaust gas sensor monitors reductant slip through the first catalyst and a controller adjusts injection conditions based on feedback from the exhaust gas sensor. For example, if the reductant slip through the first catalyst is relatively high, then $NO_x$ sensed at the exhaust gas sensor in the exhaust manifold may be higher than a threshold value, where the threshold value is based on a combination of engine output $NO_x$ and an expected slip. The expected slip may be adjusted based on the injection pressure, EGR flow rate, and first catalyst temperature.

At 526, the method 500 includes determining if adjustments are desired. For example, if the $NO_x$ sensed at the exhaust gas sensor in the exhaust manifold is substantially equal to the threshold value, then adjustments are not desired and the method 500 proceeds to 528 to maintain current injection parameters and does not adjust injection conditions. Alternatively, if the $NO_x$ sensed at the exhaust gas sensor in the exhaust manifold is less than or greater than the threshold value, then adjustments are desired and the method 500 proceeds to 530. The adjustments may vary based on the $NO_x$ sensed being less than or greater than the threshold value. For example, if the $NO_x$ sensed is less than the threshold value, then a controller may signal to an actuator of the first injector to increase an injection amount of the first injector. The increase may be in proportion to a difference between the $NO_x$ sensed and the threshold value. As such, as the difference increases, the increase increases. In one example, the increase may be split among the first and second injectors and/or equally applied to both of the first and second injectors.

If the $NO_x$ sensed is greater than the threshold value, then adjustments may include decreasing an injection amount. The controller may signal to the actuator of the first injector to inject less reductant in response to the sensed $NO_x$ being greater than the threshold value. This may limit engine $NO_x$ output as a result of reductant slip while also allowing the second catalyst to refill its reductant store. In one example, the decrease is in proportion to a difference between the sensed $NO_x$ and the threshold value. Alternatively, an injection pressure may be adjusted in response to the sensed $NO_x$ being greater than the threshold value. In one example, the injection pressure is decreased and the duration is increased. This allows the first catalyst to receive less reductant at a given instance during the injection, which may allow the catalyst to capture more reductant flowing therethrough, resulting in less reductant slip. Additionally or alternatively, the controller adjusts an injection amount of the second injector to inject more reductant.

Thus, a ratio between the first and second injectors is shifted during a first condition where both injectors are injecting. In one example, reductant slip is measured coming around the LP-EGR passage and measured by the exhaust gas sensor located in the exhaust manifold upstream of the first injector. The controller signals to an actuator of the first injector to inject less reductant in response to the $NO_x$ sensed at the sensor being greater than the threshold value. This may prevent increased $NO_x$ output from the engine due to reductant slipping through the LP-EGR passage. Additionally, an injection amount of the second injector is increased proportionally to the decrease of the injection amount corresponding to the first injector. As such, the ratio is biased toward the second injector, while a total injection amount (e.g., sum of the injection amounts corresponding to both injectors) remains constant.

At 531, the method 500 includes terminating the injection once the injection amount is met. As such, the controller may track an amount of reductant injected by each of the injectors into the exhaust passage. Once the injection amount for an injector is met, the injector is shut-off (e.g., deactivated). In one example, the first or second injector is deactivated while the other injector remains activated.

At 532 of FIG. 5C, the method 500 proceeds to following determination of the first catalyst reductant store being less than the first threshold store at 510, the method 500 includes determining an injection amount. This may be substantially similar to 516, however, an injection amount for the second injector is not determined.

At 534, the method 500 includes determining if EGR is flowing, similar to 518. If EGR is flowing, then the method 500 proceeds to 540 to monitor injection conditions via the exhaust manifold exhaust gas sensor. If EGR is not flowing, then the method 500 proceeds to 536 to inject reductant with only the first injector. At 538, the method 500 includes intrusively flowing EGR in response to the engine not demanding EGR, similar to 522 described above. This allows a controller to perform diagnostic adjustments to the injection based on feedback from the exhaust gas sensor in the exhaust manifold at 540.

At 542, the method 500 determines if adjustments are desired, similar to 526 described above. As such, if the $NO_x$ sensed is substantially equal to the threshold value, then adjustments are not desired and the method 500 proceeds to 544 to maintain current engine operating parameters and continues to inject with only the first injector.

However, if the sensed $NO_x$ is less or greater than the threshold value, then adjustments are desired and the method 500 proceeds to 546 to adjust injection conditions. In one example, the adjustments are similar to those described at 530 excluding the adjustments described with respect to the second injector. Thus, the injection amount is decreased if the $NO_x$ sensed is greater than the threshold value and increased if the $NO_x$ sensed is less than the threshold value.

At 547, following 544 or 546, the method 500 includes terminating the injection in response to the injection amount determined for the first injector being met.

At 548 of FIG. 5D, following determination by the method 500 at 512 that the reductant store of the second catalyst is less than the second threshold store, the method 500 includes determining an injection amount for the second injector. 548 may be substantially similar to 532, but with respect to the second injector. As such, the injection amount is based on a difference between the reductant store of the second catalyst and the second threshold store, wherein the amount increases as the difference increases.

At 550, the method 500 includes determining if the second injector reservoir (e.g., reservoir 476 of FIG. 4) comprises a sufficient volume of reductant. The controller may determine the reductant volume within the reservoir based on feedback from a volume sensor located inside the reservoir. If the reductant volume in the second reservoir comprises a volume of reductant greater than a threshold volume then the reservoir may comprise a sufficient amount of volume. In one example, the threshold volume is based on a quarter-full reservoir volume. Alternatively, the threshold volume is adjustable and substantially equal to the determined injection amount. If the volume is greater than the threshold volume, then the method 500 proceeds to 552 to perform the injection via only the second injector. As such, the first injector does not inject reductant.

At 554, the method 500 includes terminating the injection once the injection amount is met.

Returning to 550, if the reductant volume in the second reservoir is less than the threshold volume, then the method 500 proceeds to 555 to determine the injection amount for the first and second injectors. In one example, the injection amount of the first injector is substantially equal to a difference between the reductant volume in the second reservoir and the injection amount for the second injector. For example, if the injection amount is substantially equal to 30% of the volume of the second reservoir, but the second reservoir comprises a volume of reductant equal to a 10% fill, then the first injector may be used to supplement the difference (e.g., 20%). Alternatively, the injection amount determined at 548 is divided evenly between the first and second injectors when possible. For example, if the injection amount is substantially equal to 30% of the volume of the second reservoir and the second reservoir comprises a volume of reductant corresponding to 20%, then the injection amount is evenly divided between the first and second injectors such that the injectors both inject 15% of their reservoir volumes. It will be appreciated by someone skilled in the art that the above percentages may be altered based on an exhaust system configuration. Additionally or alternatively, if a reductant volume in a first injector reservoir (e.g., first injector reservoir 473 of FIG. 4) is greater than a threshold volume (e.g., 70% filled), then the injection amount for the first injector may be greater than the amount for the second injector. This may preserve the reductant volume in the second reservoir for future injections while also reducing a number of reservoir refills.

At 556, the method 500 includes injecting via the first and second injectors. As such, the first injector injects reductant into the exhaust passage upstream of the first catalyst which comprises a reductant store greater than the first threshold store, where the reductant slips through the first catalyst and flows toward the second catalyst. The second injector injects reductant directly upstream of the second catalyst, where the reductant uninterruptedly flows to the second catalyst. As such, reductant from both injectors is stored in the second catalyst.

At 558, the method 500 includes determining if EGR is flowing. This may be similar to 518 and 534 described above. If EGR gas is not flowing, then the method 500 proceeds to 560 to intrusively flow EGR gas as described above to 522 and 538. If the EGR gas is flowing or the intrusively flowing EGR gas is initiated, the method 500 proceeds to 562 to monitor injection conditions via the exhaust gas sensor in the exhaust manifold. As described above, a portion of reductant injected by the first injector is captured by the LP-EGR passage and direct to the engine, where the reductant is combusted and directed toward the exhaust gas sensor. Thus, the sensor may sense $NO_x$ and the value may be compared to the threshold value, as described above.

At 564, the method includes determining if adjustments are desired based on a variation between the sensed $NO_x$ and the threshold value. If the sensed $NO_x$ and the threshold value are substantially equal, then the method 500 proceeds to 566 and maintains current injection parameters and does not adjusting the injection conditions. However, if the sensed $NO_x$ is less than or greater than the threshold value, then the method proceeds to 568 to adjusting injection conditions. In one example, if the sensed $NO_x$ is less than the threshold value, then the adjusting may include increasing the injection amount of the first injector. In this way, reductant slip through the first catalyst is increased to restore the reductant store of the second catalyst.

Although the method 500 is described with reference to FIGS. 1 and/or 4, it may be similarly applied to FIG. 2. As such, the method 500 injects fuel from the second sensor directly upstream of the $NO_x$ trap to reduce $NO_x$ into $NH_3$ for the second catalyst. The description above regarding adjusting injection amounts for the second injector while monitoring injection conditions via the EGR flow are similar. That is to say, reducing an injection amount for the second injector in the description of method 500 is similarly applied to the fuel injection through the second injector. Thus, the second injector is operated substantially similarly whether it is configured to inject reductant or fuel.

In one example, if the second injector is a fuel injector, the method 500 may bias injection amounts toward the first injector to preserve fuel. For example, an injection amount of the second injector is added to the injection amount of the first injector to determine a total injection. Although the first injection amount corresponds to reductant and the second amount corresponds to fuel, a reductant store replenishment of the two injections may be substantially similar such that the amounts may be readily combined without a conversion factor. Alternatively, the reductant injection is more efficient in restoring a catalyst reductant store than the fuel injection. At any rate, the amounts are combined and the method may disproportionally divide the total amount of injection between the two injectors. In one example, the first injector is biased and receives a greater amount of the total injection to reduce fuel economy while still reducing reductant stores in the second catalyst via reductant slip through the first catalyst. Alternatively, the second injector may be biased and receive a greater portion of the total injection amount. This may preserve a reductant volume in the first reservoir, thereby reducing a reservoir refilling frequency.

In this way, an exhaust system comprises a first catalyst having a first injector and a second catalyst having a second injector. A LP-EGR passage is located between the first catalyst and the second injector. The LP-EGR passage may flow an amount reductant slip from the first catalyst to the engine. A $NO_x$ sensor in an exhaust manifold upstream of the first injector senses $NO_x$ concentrations in the exhaust gas, which may be used to monitor injection conditions. The technical effect of tracking injection conditions by flowing EGR while the first injector is injecting is to determine if too much reductant is slipping through the first catalyst. If this is the case, then the first injector may be adjusted to inject less reductant to decrease $NO_x$ formation at the engine corresponding to the reductant slip. Alternatively, if reductant slip through the first catalyst is determined to be too low, then the first injector may be adjusted to inject more reductant to allow the first catalyst to reach a desired reductant store. Additionally or alternatively, the second injector is adjusted to inject more in response to reductant slip through the first catalyst being too low. This may allow the second catalyst to reach a desired reductant store independent of the first injector injections.

A first arrangement in a motor vehicle having an internal combustion engine with an exhaust tract from which a low-pressure exhaust-gas recirculation system branches off and in which an exhaust-gas aftertreatment system is arranged, the exhaust-gas aftertreatment system comprising a diesel oxidation catalyst, a first selective catalytic reduction device downstream of the diesel oxidation catalyst and upstream of an intersection in the exhaust tract from which the low-pressure exhaust-gas recirculation branches off, a second catalytic reduction device located in the exhaust tract downstream of the intersection, at least one first reducing agent feed device which is arranged upstream of the first selective catalytic reduction device and downstream of the diesel oxidation catalyst, and at least one second reducing agent feed device which is arranged downstream of the branching point of the exhaust-gas recirculation system and upstream of the second catalytic reduction device. A first example of the arrangement further includes where the first reducing agent feed device and the second reducing agent feed device are designed for introducing gaseous ammonia or an aqueous ammonia solution into the exhaust tract. A second example of the arrangement optionally including the first example further includes where the second reducing agent feed device is configured to inject gaseous ammonia, aqueous ammonia solution, or fuel, and is upstream of a nitrogen oxide trap catalyst. A third example of the arrangement, optionally including one or more of the first and second examples, further includes where the nitrogen oxide trap catalyst is upstream of the second selective catalytic reduction device and corresponds to the second reducing agent feed device, and the reducing agent that is introduced is gaseous ammonia produced in the second nitrogen oxide trap catalyst of the fourth catalytic converter. A fourth example of the arrangement, optionally including one or more of the first through third examples, further includes where a feed device for fuel is arranged upstream of the fourth catalytic converter, where the feed device is a fuel injector or a vaporizer. A fifth example of the arrangement, optionally including the first through fourth examples, further includes where the exhaust tract includes at least one exhaust gas sensor downstream of the third catalytic converter. A sixth example of the arrangement, optionally including one or more of the first through fifth examples, further includes a controller storing instructions in non-transitory memory that when executed enable the controller to operate an internal combustion engine such that exhaust gas is conducted through the exhaust tract, introduce a reducing agent into the exhaust tract upstream of the first selective catalytic reduction device by way of the first reducing agent feed device, conduct nitrogen oxides not reduced in the first selective catalytic reduction device in the exhaust-gas flow onward to the second catalytic reduction device if said nitrogen oxides are not recirculated with the exhaust gas back to the internal combustion engine via the exhaust-gas recirculation arrangement, and introduce a reducing agent downstream of the branching point of the low-pressure exhaust-gas recirculation system and upstream of the second catalytic reduction device by way of the second reducing agent feed device.

A first method comprising flowing low-pressure exhaust gas to an engine while a first injector is injecting, the first injector is positioned to inject into an exhaust passage upstream of a first selective catalytic reduction device and a low-pressure exhaust gas recirculation passage branches from the exhaust passage downstream of the first selective catalytic reduction device, sensing reductant slip through the first selective catalytic reduction device via an exhaust gas sensor located in an exhaust passage upstream of the first injector, and adjusting injection conditions in response to a comparison between a sensed $NO_x$ value and a threshold $NO_x$ value. A first example of the method further includes where the threshold $NO_x$ value is based on a sum of an expected engine output $NO_x$ and an expected $NO_x$ increase corresponding to the reductant slip. A second example of the method optionally including the first example further includes where the adjusting includes decreasing an injection amount of the first injector in response to the comparison indicating the sensed $NO_x$ being greater than the threshold $NO_x$ value. A third example of the method optionally include the first and/or second examples and further includes where the adjusting further includes adjusting injection conditions of the second injector corresponding to a second selective catalytic reduction device, where the second injector is upstream of the second selective catalytic reduction device and downstream of the exhaust gas recirculation passage. A fourth example of the method, optionally including one or more of the first through third examples, further includes where the adjusting in response to the comparison includes increasing an injection amount of the second injector when the sensed $NO_x$ is greater than the threshold $NO_x$ value. A fifth example of the method, optionally including one or more of the first through fourth examples, further includes flowing low-pressure exhaust gas is in response to an engine exhaust gas recirculation demand or the first injector injecting.

A second method comprising injecting reductant into an exhaust passage via first and second injectors, where the first injector is upstream of a first selective catalytic reduction device and the second injector is upstream of a second selective catalytic reduction device, further comprising an exhaust gas recirculation passage coming off the exhaust passage between the first selective catalytic reduction device and the second injector and injecting reductant via both injectors during a first condition, where a ratio between the injectors is adjusted responsive to sensing recirculated reductant slip coming around through EGR passage, and where the sensing occurs at an exhaust gas sensor located in an exhaust passage upstream of the first injector. A first example of the method further includes where the first injector and second injector inject a gaseous ammonia or a liquid ammonia solution. A second example of the method, optionally including the first example, further includes where the first injector injects urea and the second injector injects fuel, further comprising a nitrogen oxide trap catalyst being located between the second injector and the second selective catalytic reduction device. A third example of the method, optionally including the first and/or second examples, further includes adjusting injection amounts of the first and second injectors, the adjusting being in response to a comparison between a $NO_x$ sensed by the exhaust gas sensor in the exhaust passage and a threshold value, the adjusting further comprising decreasing a first injector injection amount and increasing a second injector injection amount in response to the $NO_x$ sensed being greater than the threshold value. A fourth example of the method, optionally including one or more of the first through third examples, further includes where the first injector is configured to inject reductant into the exhaust passage directly upstream of the first selective catalytic reduction device located between the injector and the exhaust gas recirculation passage, and where the second injector is configured to inject reductant into the exhaust passage upstream of the second selective catalytic reduction device, and where the second injector is located between the exhaust gas recirculation passage and the second catalyst. A fifth example of the method, optionally including one or more of the first through fourth examples, further includes where the first injector and second injector inject in response to one or more of a reductant store of the first selective catalytic reduction device being less than a first threshold store and a reductant store of the second catalytic reduction device being less than a second threshold store. A sixth example of the method, optionally including one or more of the first through fifth examples, further includes injecting in response to the reductant store of the second catalyst being less than the second threshold store and a reductant volume in a second reservoir corresponding to the second injector is less than an injection amount determined for the second injector further includes dividing the injection amount between the first and second injectors based on a reductant slip through the first catalyst coming around the exhaust gas recirculation passage, and where the injection amount of the first injector is increased in response to a $NO_x$ sensed at the exhaust gas sensor being less than a threshold value.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
   flowing low-pressure exhaust gas to an engine while a first injector is injecting, where the first injector is positioned to inject into an exhaust passage upstream of a first selective catalytic reduction device for treating $NO_x$ and a low-pressure exhaust gas recirculation passage branches from the exhaust passage downstream of the first selective catalytic reduction device;
   sensing reductant slip through the first selective catalytic reduction device via an exhaust gas sensor located in the exhaust passage upstream of the first injector; and
   adjusting injection conditions in response to a comparison between a sensed $NO_x$ value and a threshold $NO_x$ value.

2. The method of claim 1, wherein the threshold $NO_x$ value is based on a sum of an expected engine output $NO_x$ and an expected $NO_x$ increase corresponding to the reductant slip.

3. The method of claim 1, wherein the adjusting includes decreasing an injection amount of the first injector in response to the comparison indicating the sensed $NO_x$ value being greater than the threshold $NO_x$ value.

4. The method of claim 3, wherein the adjusting further includes adjusting injection conditions of a second injector corresponding to a second selective catalytic reduction device for treating $NO_x$, where the second injector is upstream of the second selective catalytic reduction device and downstream of the low-pressure exhaust gas recirculation passage.

5. The method of claim 4, wherein the adjusting in response to the comparison includes increasing an injection amount of the second injector when the sensed $NO_x$ value is greater than the threshold $NO_x$ value.

6. The method of claim 1, wherein flowing low-pressure exhaust gas is in response to an engine exhaust gas recirculation demand or the first injector injecting.

7. A method comprising:
   injecting reductant into an exhaust passage via first and second injectors, where the first injector is upstream of a first selective catalytic reduction device for treating $NO_x$ and the second injector is upstream of a second selective catalytic reduction device for treating $NO_x$, further comprising an exhaust gas recirculation passage coming off the exhaust passage between the first selective catalytic reduction device and the second injector; and injecting reductant via both injectors during a first condition, where a ratio between the injectors is adjusted responsive to sensing recirculated reductant slip coming around through an EGR passage, and where the sensing occurs at an exhaust gas sensor located in the exhaust passage upstream of the first injector.

8. The method of claim 7, wherein the first injector and the second injector inject a gaseous ammonia or a liquid ammonia solution.

9. The method of claim 7, wherein the first injector injects urea and the second injector injects fuel, further comprising a nitrogen oxide trap catalyst being located between the second injector and the second selective catalytic reduction device.

10. The method of claim 7, further comprising adjusting injection amounts of the first and second injectors, the adjusting being in response to a comparison between a $NO_x$ sensed by the exhaust gas sensor in the exhaust passage and a threshold value, the adjusting further comprising decreasing a first injector injection amount and increasing a second injector injection amount in response to the $NO_x$ sensed being greater than the threshold value.

11. The method of claim 7, wherein the first injector is configured to inject reductant into the exhaust passage directly upstream of the first selective catalytic reduction device located between the injector and the exhaust gas recirculation passage, and where the second injector is configured to inject reductant into the exhaust passage upstream of the second selective catalytic reduction device, and where the second injector is located between the exhaust gas recirculation passage and the second selective catalytic reduction device.

12. The method of claim 11, wherein the first injector and the second injector inject in response to one or more of a reductant store of the first selective catalytic reduction device being less than a first threshold store and a reductant store of the second selective catalytic reduction device being less than a second threshold store.

13. The method of claim 12, wherein injecting in response to the reductant store of the second selective catalytic reduction device being less than the second threshold store and a reductant volume in a second reservoir corresponding to the second injector is less than an injection amount determined for the second injector further includes dividing the injection amount between the first and second injectors based on a reductant slip through the first selective catalytic reduction device coming around the exhaust gas recirculation passage, and where the injection amount of the first injector is increased in response to a $NO_x$ sensed at the exhaust gas sensor being less than a threshold value.

* * * * *